United States Patent [19]

Nutter

[11] E Re. 29,638

[45] Reissued May 23, 1978

[54] PRESSURE CONTROLLED TEST VALVE SYSTEM FOR OFFSHORE WELLS

[75] Inventor: Benjamin P. Nutter, Bellville, Tex.

[73] Assignee: Schlumberger Technology Corporation, New York, N.Y.

[21] Appl. No.: 707,798

[22] Filed: Jul. 22, 1976

Related U.S. Patent Documents

Reissue of:

[64] Patent No.: 3,824,850
Issued: Jul. 23, 1974
Appl. No.: 199,554
Filed: Nov. 17, 1971

[51] Int. Cl.[2] ..... E21B 47/00

[52] U.S. Cl. ..... 73/151; 166/128

[58] Field of Search ..... 73/151, 152, 155; 166/126, 128, 148, 151

[56] References Cited

U.S. PATENT DOCUMENTS

| | | | |
|---|---|---|---|
| 3,304,776 | 2/1967 | Bennett et al. | 73/151 |
| 3,318,145 | 5/1967 | Lynn et al. | 73/152 |
| 3,353,605 | 11/1967 | Garrett et al. | 166/53 |
| 3,664,415 | 5/1972 | Wray et al. | 166/.5 |

*Primary Examiner*—Jerry W. Myracle
*Attorney, Agent, or Firm*—David L. Moseley; William R. Sherman; Stewart F. Moore

[57] ABSTRACT

Methods and apparatus for performing a drill stem test of an offshore well utilizing a pressure controlled test valve. The test valve includes a valve element having a transverse pressure area with the high pressure side exposed to the pressure of fluids in the well annulus and the low pressure side subject to the pressure of a compressible fluid medium contained within a chamber in the test valve. The pressure in the chamber is equalized with the hydrostatic head of the well fluids so that at test depth the same pressure is acting on both sides of the transverse pressure area, whereupon this pressure is confined within the chamber. Then a fluid pressure in excess of the hydrostatic head is applied to the well fluids externally of the test valve to develop a pressure difference across the valve element which causes it to shift from closed to open position.

43 Claims, 7 Drawing Figures

PRESSURE CONTROLLED TEST VALVE SYSTEM FOR OFFSHORE WELLS

Matter enclosed in heavy brackets [ ] appears in the original patent but forms no part of this reissue specification; matter printed in italics indicates the additions made by reissue.

This invention relates generally to earth formation testing, and more particularly to a new and improved method and apparatus for conducting a drill stem test of an offshore well utilizing a test valve that is remotely controlled by the application of pressure to the well fluids at the surface.

To conduct what is commonly known as a drill stem test, a packer and a tester valve are lowered into a well on a pipe string, and the packer is set to isolate the formation interval to be tested from the hydrostatic pressure of fluids thereabove. The test valve is then opened and closed to alternately flow and shut-in the formations, while pressure recorders make a record of the pressures as a function of time. From the pressure record, many useful formation parameters or characteristics can be determined. Usually, a sample of the produced formation fluids is recovered.

For drill stem tests of land based wells, it is typical practice to provide a test valve that can be opened and closed in response to manipulation of the pipe string at the surface. The surface manipulations may either be rotation, longitudinal movement or a combination of the two. However, for offshore wells, which are becoming more and numerous as exploration for oil extends to and beyond the continental shelf, it is generally considered to be undesirable to have to manipulate the pipe string during a drill stem test, particularly for tests conducted from a floating rig that is subject to vertical movement due to the action of waves and tides. This is because there are certain hazards involved in manipulating a pipe string that is under pressure, and operators would prefer to keep the blowout prevents closed against the pipe string at all times during a test. All such precautions are taken, of course, to the view of eliminating the causes which might lead to a fire or blowout with the consequent loss of highly expensive drilling equipment, and to pollution of the waters.

For drill stem testing in the offshore environment, a test system has been developed which does not require pipe manipulation for operation, but rather includes a test valve that moves between open and closed positions in response to the application and release of pressure to the well annulus between the pipe string and the well bore wall. This system utilizes a housing with a slidable inner valve mandrel having a piston with a precharged gas pressure acting on one side and with the other side exposed to annulus pressures. To open the valve, applied annulus pressure compresses the gas and acts to move the valve mandrel to open position. A release of the applied annulus pressure enables the gas pressure to shift the valve mandrel back to closed condition. However, the principle disadvantage of this approach is that the gas must be precharged at the surface to a value that will maintain the valve mandrel in closed condition during lowering into the well. This is because the hydrostatic pressure increases with depth, and of course the pressure is tending to force the valve mandrel to open position. Accordingly, extensive calculations are necessary in preparation for a test to determine the gas pressure required for precharging the tool. A large amount of well data is needed including mud weight, testing depth, and temperature at that depth. Corrections must be calculated for temperature difference due to precharging the gas at the surface. All of this is quite burdensome and is based upon data which is not always available.

It is the principle object of this invention to provide a new and improved drill stem testing system that can be operated by applied annulus pressures and without the necessity for a critical gas precharge and the elaborate surface calculations required in the prior art.

This and other objects are attained in accordance with the concepts of the present invention which from a method or process standpoint comprises the steps of lowering into a fluid-filled well bore and to test depth a pressure controlled test valve including a valve element with a transverse pressure area that is subject on one side to the pressure of the fluids in the well bore and on the other side to the pressure of a compressible fluid medium such as nitrogen gas contained within a chamber in the test valve. As the test valve is lowered, the pressure of the fluid medium is equalized with the hydrostatic head of the fluids externally of the test valve so that the same pressure acts on both sides of the transverse area of the valve element. Thus the valve element is not moved at all as the test valve is lowered. At test depth, the method is further practiced by confining the hydrostatic head of the well fluids at such depth within the chamber, and then applying fluid pressure to the well bore at the surface which results in an excess of fluid pressure at the test valve over and above the normal hydrostatic head that is confined within the chamber. The applied pressure acts across the transverse area of the valve element to move it from its normal position prohibiting fluid flow from the formations being tested to its open position where the formation fluds can flow via the test valve into the pipe string thereabove. To shut-in the formations for the recordal of pressure build-up information, the applied pressure is released at the surface and the valve element is returned to the closed position. Preferably, the chamber containing the compressible fluid medium is precharged in preparation for lowering into the well to a pressure that is somewhat less than the hydrostatic pressure expected at test depth, however the actual precharge pressure valve is not critical because the pressure in the chamber is balanced with the hydrostatic head and is maintained at whatever value that may be as the applied pressure is used to control the valve element.

From an apparatus standpoint, the concepts of the present invention are attained through the provision of an elongated housing member adapted for connection to a pipe string and having a flow passage extending longitudinally therethrough. A valve element is movable within the housing member between positions closing and opening the flow passage, and is spring biased toward closed position. The valve has oppositely facing pressure surfaces that are arranged such that one face is selectively subjected to the pressure of fluids externally of the housing body through the medium of a compressible fluid such as nitrogen gas, while the other face is always subject to the pressure of fluids externally of the housing body. Thus during lowering into a fluid filled well bore the valve is balanced with respect to hydrostatic pressure, and the pressure of the compressible medium precisely reflects the value of hydrostatic pressure externally of the housing body.

The compressible medium is contained in a chamber within the housing member, and the hydrostatic head is applied to the chamber by way of a pressure channel that is adapted to be closed at test depth and prior to initiation of the test. Upon closing of the pressure channel, the hydrostatic pressure value is "memorized" in the chamber. With the chamber closed, the application of pressure to the fluid in the annulus will develop a pressure differential across the oppositely facing pressure surfaces of the valve to force it against the bias of the spring to open position, and release of applied pressure will enable the valve to return to closed position. The displacement volume due to movement of the valve is proportioned with respect to the volume of the chamber such that movement of the valve from closed to open position has a negligible effect on the memorized fluid pressure in the chamber. Thus the pressure that is applied to the well annulus to operate the valve is a substantially fixed value for any test depth. The chamber may be precharged at the surface with a pressure that is less than the expected hydrostatic pressure of the well fluids at test depth, however, as previously mentioned this pressure is not critical and there is no need for any elaborate surface calculations in this regard.

The present invention has other objects and advantages which will become more readily apparent in connection with the following detailed description of preferred embodiments, taken in conjunction with the appended drawings in which.

Figure 1:
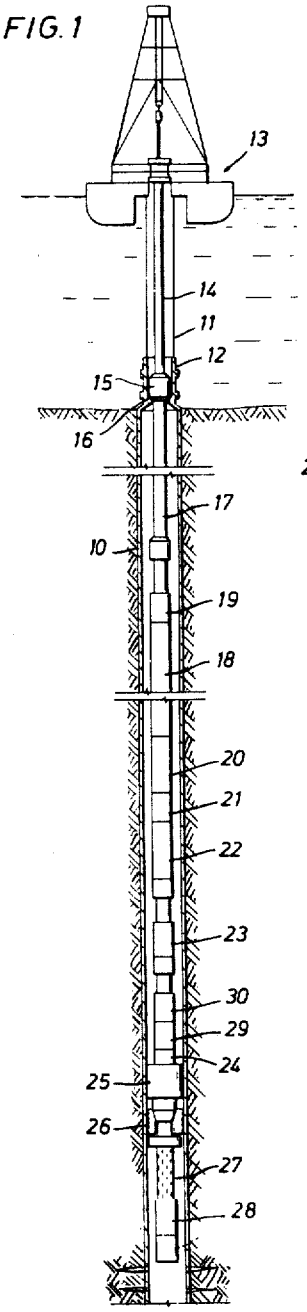
FIG. 1 illustrates somewhat schematically a drill stem testing being conducted in an offshore well from a floating rig.

Referring initially to FIG. 1, a drill stem test using equipment constructed in accordance with the principles of the present invention is shown being conducted in an offshore well. Although the well may be open hole, it is usually cased at 10 as shown. A riser 11 normally extends from a subsea well head assembly 12 upward to the floating drilling rig or vessel 13 which is anchored or otherwise moored on location. A pipe string 14 extends from the vessel 13 downward into the well and is used to lower the test tools to test depth. The pipe string 14 can include a sub sea control valve assembly 15 of typical design and providing a landing shoulder 16 that is seated in the well head assembly 12 so that the pipe string and test tools therebelow are suspended from a fixed point not subject to vertical motion which the vessel 13 experiences under the influence of wave and tide action. A major string of pipe 17, such as a suitable length drill pipe, is connected to a minor string of pipe 18, such as drill collars having a preselected weight, by a slip joint and safety valve combination tool 19 of the type disclosed in U.S. Pat. application Ser. No. 42,372, Kisling, filed June 1, 1970 now U.S. Pat. 3,652,439 and assigned to the assignee of this invention. The lower end of the minor string 18 may be connected to a reversing valve 20 which is in turn connected to a choke assembly 21, the reversing valve and choke assembly being conventional items of equipment whose details form no part of the present invention. Of course the choke assembly 21 limits the rate of upward flow of formation fluids during a test, and the reversing valve 20 can be operated in such a manner as to enable fluids that are produced into the pipe string during a test to be recovered at the surface before the test equipment is retrieved.

A pressure controlled test valve 22 that is constructed in accordance with the principles of this invention is next connected in the string of tools and will be described in detail herebelow. The test valve 22 may be coupled to the upper end of a flow control valve 23 of the type shown in my U.S. Pat. No. 3,308,887, also assigned to the assignee of this invention, the valve 23 being operated in response to only vertical motion of the pipe string. For purposes of isolating the well interval to be tested from the hydrostatic head of fluids thereabove, a well packer 24 is provided and includes packing elements 25 to seal off the well bore and slips 26 to anchor at the proper level above the well interval to be tested. The packer 24 can be of the type shown in U.S. Pat. No. 3,399,727, McGill, assigned to the assignee of the invention, and includes an integral fluid bypass arrangement that enables well fluid to bypass through the packing element 25 during lowering, but is closed off when the packer is set. The elements 25 seal off the cross-section of the well bore to isolate the zone to be tested from the fluid in the annulus thereabove, and of course at the end of the test the bypass referred to above is opened to equalize pressure and enable release of the packer 24 and retrieval of the tools to the surface. Suspended below the packer 24 is a perforated nipple 27 to enable fluid entry during the test, and of course suitable pressure recorders 28 are provided to make a record of the pressures of fluids versus time as the test proceeds. Other typical equipment such as a safety joint 29 and a jar 30 can be connected between the control valve 23 and the packer 24 but as shown only schematically to simplify this disclosure.

In general terms, a formation test amounts to a temporary completion of the well, in that the isolated formations are allowed to produce fluids into the pipe string. The formation is then shut-in and the pressure allowed to bluid up over a period of time. A record of the pressure build-up curve can be analyzed by known techniques to determine formation permeability and the initial or virgin formation pressure, plus other parameters that are invaluable aids to a reservoir engineer in coming to a decision on whether to recommend a permanent completion of the well. Several flow and shut-in pressure records can be obtained for additional information.

Figure 2A:
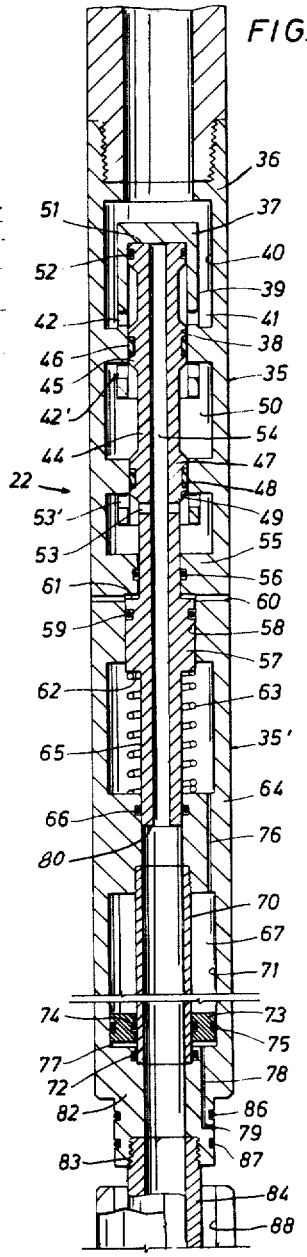
FIGS. 2A and 2B are detailed cross-sectional views of one embodiment of the present invention with parts in position for running into the well and with the control valve closed FIG. 2B forming a lower continuation of FIG. 2A.
Figure 2B:
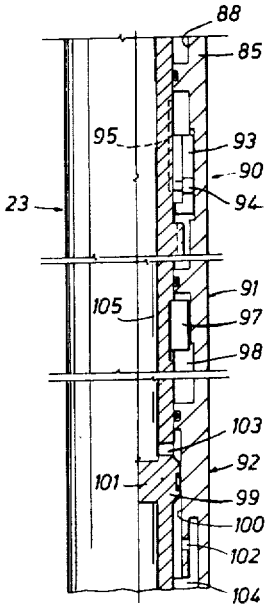

Turning now to FIGS. 2A and 2B, one embodiment of a pressure operated test valve assembly 22 that is constructed in accordance with the principles of the present invention will be described. The valve assembly 22 includes, in general, an upper sampler and valve section 35 and a lower valve operating section 35'. The sections are formed by tubular housing member 36 having its upper end adapted as shown for connection to a pipe string and with its through bore closed by a barrier 37 located above an annular valve seat 38. The outer side walls 39 of the barrier 37 are spaced laterally inwardly with respect to the surrounding internal walls 40 of the adjacent housing section to provide a space 41 for fluid passage. One or more side ports 42 in the walls of the barrier 37 communicate the bore thereof with the space 41. A vertically movable valve mandrel 44 has its upper end portion slidably received within the bore of the barrier 37, and a valve head 45 carries seal elements 46 which engage the valve seat 38 when the valve mandrel is in its upper or closed position. A second valve head 47 is provided on the valve mandrel 44 in spaced relation to the upper valve head 45 and also carries seal elements 48 which normally engage a lower annular valve seat 49. The annular space 50 surrounding the valve mandrel 44 between the seats 38 and 49 provides a sample chamber for trapping the last flowing sample of formation fluids as will be described further below. The center bore 54 of the valve mandrel 44 is open from one end to the other so that fluid pressures are free to act on the upper end surface 51 thereof, however the uppermost end of the mandrel is sealed with respect to the barrier 37 by a suitable seal ring 52. One or more ports 53 extend through the wall of the valve mandrel 44 below the lower valve head 47 to communicate the bore 54 with the interior of the housing section below the valve seat 49. The lower end portion of the housing section 36 has an inwardly directed shoulder 55 through which an intermediate portion of the valve mandrel 44 is sealingly slidable. Fluid leakage is prohibited by a seal ring 56.

The valve mandrel 44 has a stepped diameter outer wall surface to provide a piston section 57 whose outer periphery is sealed against the adjacent cylinder wall 58 by a seal ring 59. A plurality of ports 60 extend laterally through the wall of the housing 36 below the shoulder 55 so that the upwardly facing transverse surface 61 of the piston section 57 is subjected to the pressure of fluids in the well annulus outside the housing. The lower face 62 of the piston section 57 is engaged by a coil spring 63 whose lower end rests on an inwardly directed shoulder 64 on the housing 36. The outer surface of the lower portion 65 of the valve mandrel 44 is sealed with respect to the shoulder 64 by a seal ring 66.

An elongated chamber 67 of substantial volume is formed in a lower portion of the housing 36. The chamber 67 is defined between the outer surface of a tube 70 whose upper end is connected to the shoulder 64, and the surrounding inner wall surface 71 of the housing, the lower end of the tube 70 being sealed against the housing by a suitable seal ring 72. An annular floating piston 73 normally is disposed at the lower end of the chamber 67 and is provided with internal and external seats 74 and 75. The chamber 67 is adapted to be filled through a suitable valve port (not shown) with a compressible fluid medium such as nitrogen gas, and a suitable communication path 76 extends upwardly through the shoulder 64 so that the pressure of the nitrogen can act upwardly on the downwardly facing transverse surface 62 of the piston section 57 on the valve mandrel 44. The interior space 77 of the housing 36 below the floating piston 73 is placed in communication with the well annulus by a pressure channel that is constituted by a vertically extending port 78 which terminates in a side opening 79. Thus it will be readily appreciated that as the tester valve assembly 22 is lowered into a fluid filled well bore, the hydrostatic head of the well fluids is communicated by the ports 79, 78 and transmitted by the floating piston 73 to the nitrogen within the chamber 67. Inasmuch as the upper and lower surfaces 61 and 62 of the piston section 57 can be subjected to the same pressure, the hydrostatic head of the well fluids does not tend to move the valve mandrel 44 toward open position. Moreover, the pressure of any fluids present within the bore 54 of the valve mandrel 44 acts upwardly on the lower end surface 80 thereof, downwardly on the upper end surface 51 thereof, and on the lower transverse surface of the lower valve head 47 via the ports 53. It can be demonstrated that the fluid pressures are acting with equal force in opposite longitudinal directions, so that the valve mandrel 44 is balanced with respect to fluid pressures as the equipment is lowered to setting depth. This being the case, the valve mandrel 44 does not move vertically as the hydrostatic head increases.

The lower end of the housing 36 has a reduced diameter portion 82 which is connected by threads 83 to the mandrel 84 of the flow control valve assembly 23. The mandrel 84 is telescopically received within a housing 85 and is movable between extended and contracted positions with respect thereto. As the equipment is being lowered into the well, the mandrel 84 is in the extended position as shown so that the port 79 is open. However, when the packer 25 is set as will be subsequently described, the mandrel 84 moves downwardly with respect to the housing 85 to a position where seal rings 86 and 87 located respectively above and below the port 79 engage the inner wall 88 of a counterbore in the housing 85 to close off the port from communication with the well annulus. In this manner the hydrostatic head of the well fluids at test depth is trapped or "memorized" in the chamber 67 and does not change to any appreciable extent during operation of the valve as will become more readily apparent herebelow.

The structural details of the flow control valve assembly 23 will not be set forth at length here since reference may be had to the aforementioned U.S. Pat. No. 3,308,887. In general, however, the valve assembly 23 includes an index section 90, a hydraulic delay section 91 and a valve section 92. The index section 90 has a sleeve 93 which is mounted for rotation relative to both the housing 85 and the mandrel 84, and carries an index pin 94 which engages in an external channel configuration 95 on the mandrel. The hydraulic delay section 91 is constituted by a metering sleeve 97 that works within a fluid filled chamber 98 and functions to retard downward movement of the mandrel 84 within the housing 85, but on the other hand enables free upward movement. The valve section 92 is somewhat similar to that previously described, in that a valve head 99 on the mandrel 84 engages an annular valve seat 100 to close off fluid flow past a transverse barrier 101. When the mandrel 84 moves downwardly, however, a flow path including ports 102 and 103 and the space 104 externally of the mandrel is placed in communication with the bore 105 of the mandrel above the barrier 101.

In operation, the pressure operated test valve assembly 22 is prepared at the surface by injecting a charge of nitrogen gas into the chamber 67 and the chamber can be pressurized to an initial pressure that is not critical and for most tests should be about 2,500 psi. A guide that can be used is to charge the chamber to a pressure about 500 psi less than the hydrostatic pressure at test depth. Of course at the surface and during the initial stages of descent into the well bore, the nitrogen pressure is well in excess of the hydrostatic head of the well fluids and thus biases the valve mandrel 44 in the closed position. The string of tools is lowered from the vessel 13 into the well casing 10 until the packer 24 is located at the proper point above the formation interval to be tested. At a location well above the setting point, the hydrostatic head will have become in excess of the precharge pressure of the nitrogen within the chamber 67, and when this occurs the floating piston 73 will begin to move upwardly somewhat as it transmits the hydrostatic head to the compressible medium within the chamber. In any event, the valve mandrel 44 remains stationary because the same pressure is acting on the opposite sides 61 and 62 of the piston section 57. Due to the fact that the medium in the chamber 67 is compressible, however, the piston section 57 can move readily downwardly when a pressure difference is imposed in a downward direction thereacross.

Figure 3:
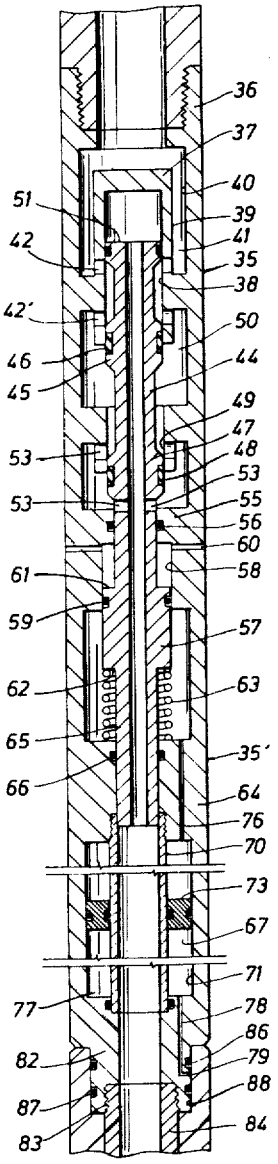
FIG. 3 is a view similar to FIG. 2 except with the parts in the positions occupied during a portion of a test where the test valve is open.

The length of the minor pipe string 18 is selected to provide the proper amount of weight to set the packer 24, and the landing sub 16 is located in the major string 17 at the proper spacing such that when the packer 25 is anchored at setting depth and the string 17 is suspended in the sub sea well head 12, the slip joint 19 is in its closed or contracted condition to enable the weight of the minor string 18 to be applied via the test tools to the packer. Of course this weight compresses and expands the packing elements 25 to seal off the test interval, and moves the tester housing 36 and the mandrel 84 downwardly to cause the control valve 23 to open, admitting fluids into the interior of the pressure operated test valve 22. Downward movement of the housing 36 with respect to the control valve housing 85 positions the housing portion 82 within the valve seat 88 to close off the port 79 from communication with the well annulus as shown in FIG. 3. The result is to trap or "memorize" the hydrostatic head of fluids within the chamber 67 so that a substantially constant pressure acts upon the lower surface 62 of the piston section 57 at all times during operation of the tester assembly 22.

With the blowout preventers closed in a typical fashion at the surface so that the well is completely under control, a formation test can be conducted without resort to manipulation of the pipe strings 17 or 18 in the following manner. Fluid pressure is applied by suitable surface pumps and control lines (not shown) to the well annulus 106 between the pipe strings 17, 18 and the surrounding casing 10. The pressure acts through the housing ports 60 on the upper surface 61 of the piston section 57 of the valve mandrel 44 to force the mandrel downwardly against the bias of the coil spring 63. In a typical example, an applied annulus pressure of 600 psi will start the valve mandrel 44 moving downwardly, and an applied pressure of 1,200 psi will cause the valve mandrel 44 to move completely downwardly to its open position as shown in FIG. 3. In this position, a fluid flow path is opened upwardly through the tester assembly so that produced formation fluids can enter the pipe string 18, the flow path being through the tube 70, the bore 50 of the valve mandrel 44, the lower mandrel and sleeve ports 53 and 53', the sample chamber 50, the upper sleeve ports 42', the barrier wall ports 42 and the annular space 41 between the barrier 37 and the adjacent housing wall 40. The valve is left open for a relatively short flow period of time sufficient to draw down the pressures in the isolated formation interval below the packer 24 and enable connate fluids within the formation to be produced into the well bore. Then the applied annulus pressure is bled off at the surface to enable the coil spring 63 to force the valve mandrel 44 upwardly to its closed or shut-in position shown in FIG. 2A. The valve mandrel 44 is left in closed position for a shut-in period of time during which the pressure recorders 28 make a record of the pressure build-up data. If desired, the valve mandrel 44 can be shifted between closed and open position repetitively by alternately applying and then releasing fluid pressure in the annulus 106.

As previously mentioned, the valve mandrel 44 is balanced aganist any opening movement due to hydrostatic fluid pressures during running, and the changes in fluid pressure that occur within the tester assembly 22 during the actual test do not affect the vertical position of the valve mandrel for the same reasons, that is, the pressures at any instant act with equal force in opposite longitudinal directions. Moreover, the parts are sized such that the volume of the chamber 67 that contains the compressed nitrogen gas is quite large in relation to the volume of displacement of the piston section 57 as it moves downwardly against the bias of the coil spring 63. For example the ratio of the chamber volume to displacement volume at test depth may be in the order of 100 to 1. Consequently, there is a negligible increase in pressure within the chamber 67 as the valve mandrel 44 is shifted downwardly, and for practical purposes the magnitude of the annulus pressure that is applied to operate the valve is a function only of the modulus or rate of the coil spring 63, which is of course quite predictable. This feature is important because it provides for a substantially constant value of the applied annulus pressure that is necessry to operate the valve, without regard to test depth and the hydrostatic head of the fluids pesent in the well bore at such depth. As a consequence, there are no elaborate calculations as required in the prior art for a critical precharge pressure for the nitrogen within the chamber 67, and the annulus pressure that is applied at the surface to operate the valve mandrel 44 is always a substantially constant amount, independent of test depth.

To terminate the test, it is only necessary to lift straight upwardly on the pipe strings 17 and 18 at the surface, thereby extending the slip joint 19 causing the control valve 23 to close as the mandrel 84 moves upwardly. The bypass associated with the packer 24 is opened to equalize pressures across the packer elements 25 so that they can retract, which is then accomplished by further lifting of the packer mandrel. Of course it will be appreciated that the reversing valve 20 can be operated in a typical fashion if it is desired to remove the fluids that have been produced into the pipe string before the tools are recovered to the surface.

As the housing 36 is elevated with respect to the control valve housing 85, the ports 79 are exposed to the well annulus, so that the pressure of the nitrogen within the chamber 67 experiences a gradual decrease as the hydrostatic head is reduced during withdrawal of the tools from the well. At the surface the chamber 67 will have the initial precharge pressure. A sample of the last porton of flowing fluids is trapped within the sample chamber 50 upon simultaneous closure of the valve heads 45 and 47, and can be removed for inspection and analysis at the surface.

Figure 4:
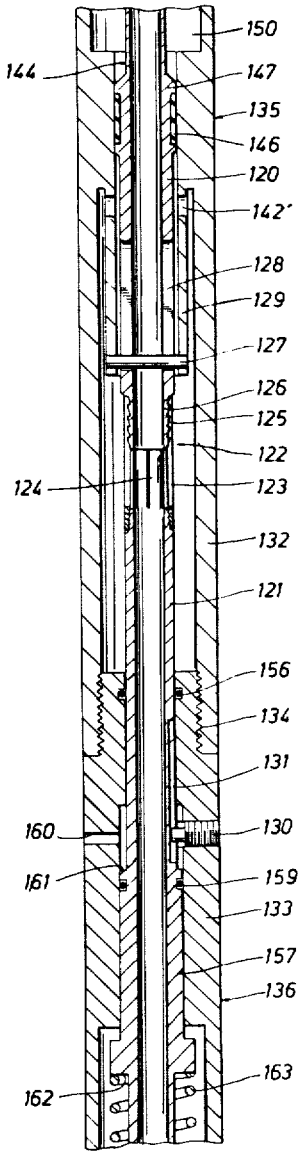
FIG. 4 is a detailed cross-sectional view of a releasable connection between the upper and lower sections of the test valve assembly shown in FIGS. 2A and 2B.

A form of the present invention which enables a readily accomplished disconnection of the sampler and valve section 35 of the tester assembly 22 is shown in FIG. 4. The valve mandrel 144 is constituted by an upper section 120 and a lower section 121 coupled together by a releasable connection 122. The connection comprises a sleeve 123 that is longitudinally slotted from its upper end to provide a plurality of upwardly extending fingers 124 having internal threads 125 that normally mesh with external threads 126 on the lower end portion of the upper mandrel section 120. In order to corotatively couple the upper mandrel section 120 to the surrounding housing 135, a cross-pin 127 extends through elongated, diagonally opposed slots 128 through the wall of the mandrel section 120, and the ends of the pin 127 are fixed to the lower end of the valve seat sleeve 129. The slots 128 are long enough to enable the valve mandrel to move vertically during pressure actuation thereof as previously described without interference with the cross pin 127. The lower section 121 of the valve mandrel 144 is corotatively coupled to the surrounding section 133 of the housing 136 by a pin 130 which projects into an elongated groove 131 formed in the exterior of the mandrel section 121. Finally the upper and lower sections 132 and 133 of the housing are joined together by thread 134.

To disconnect the valve and sampler section 135 from the valve operator section 136, so that the sample of fluids in the sample chamber 150 can be taken to a laboratory or the like for inspection and analysis, the upper housing section 132 is rotated with respect to the lower housing section 133 to disconnect the thread 134. Rotation of the housing section 32 causes corresponding rotation of the upper mandrel section 120 with respect to the lower mandrel section 121, since the mandrel section 120 is corotatively coupled to the housing section 132 by the cross pin 127, and since the lower mandrel section 121 is held stationary by the pin projection 130. The threads 125 and 126 are of the same lead and hand as the housing threads 134, whereby the members are simultaneously unthreaded. To reconnect the two sections, it is only necessary again to thread the two housing sections together. The purpose of the laterally flexible fingers 124 is to enable a thread slippage or ratcheting action of the mandrel threads 126 within the sleeve threads 125 in case these threads are fully engaged before the housing threads 134 are tightly made up.

Figure 5A:
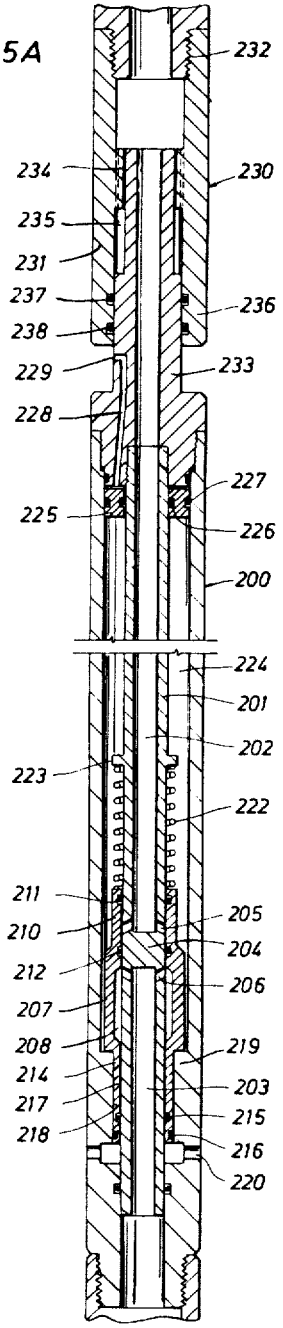
FIGS. 5A and 5B are cross-sectional views to illustrate a second embodiment of the present invention.
Figure 5B:
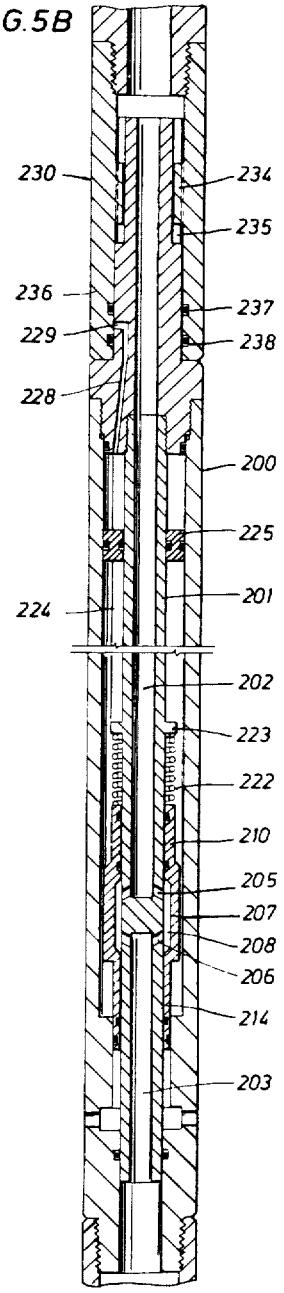

Turning now to FIGS. 5A and 5B, a second embodiment of the present invention is illustrated. In this example, the housing member 200 has a flow tube 201 disposed and fixed concentrically therein, the flow tube 201 having upper and lower bores 202 and 203 extending above and below a transverse barrier section 204. Flow ports 205 and 206 extend through the wall of the tube 201 above and below the barrier 204. An annular valve sleeve 207 is sealingly slidable on the flow tube 201 adjacent the barrier section 204, and is provided with an internal annular recess 208 of sufficient length to span the ports 205 and 206 and place them in communication when the valve sleeve is in its upper position. In its lower or closed position as shown in FIG. 5A, the valve sleeve 207 has an upper portion 210 with seal rings 211 and 212 that function to close off the ports 205. A lower portion 214 of the valve sleeve 207 has internal and external seals 215 and 216 which engage respectively the outer wall 217 of the tube 201 and the inner wall 218 on an inwardly thickened portion 219 of the housing 200 to provide an annular piston effect. The lower transverse face of the piston 214 is placed in communication with the well annulus by one or more ports 220 that extand through the wall of the housing 200.

A coil spring 222 surrounds the flow tube 201 and has its lower end pressing downwardly against the upper end of the valve sleeve 207, and its upper end engaging an outwardly directed shoulder 223 on the flow tube 201. Of course the spring 22 forces the valve sleeve 207 toward its lower or closed position. The annular cavity 224 between the flow tube 201 and the housing 200 provides a large volume chamber that is, as in the case of the first embodiment, filled with a compressible fluid medium such as nitrogen by way of a valved port (not shown). An annular floating piston 225 having inner and outer seal rings 226 and 227 segregates the upper end of the chamber 224 from a hydrostatic pressure input channel 228 which terminates in a side port 229.

A valve assembly 230 for trapping the hydrostatic pressure of the well fluids within the chamber 224 is comprised of an outer member 231 adapted by threads 232 for connection in the pipe string and telescopically disposed over an inner member 233 that is provided by a reduced diameter upper section of the housing 200. The members 231 and 233 are coupled together by coengaging splines 234 and 235, the inner spline grooves having circumferential offsets at their upper portions which are engaged by the outer spline ribs 234 to prevent downward relative movement of the outer member 231 during running. The lower portion 236 of the outer member 231 has upper and lower seal rings 237 and 238, and can span and seal off the side port 229 when the outer member is rotated a part turn to the right and then lowered with respect to the inner member 233 as shown in FIG. 5B.

The operation of the above-described device is essentially similar to the embodiment shown in FIGS. 2A and 2B in that the valve is prepared for use by injecting a precharge of nitrogen gas into the chamber 224. The gas pressure and the force of the coil spring 22 maintain the valve sleeve 207 in its lower or closed position. Inasmuch as the seal rings 211, 212 and 215 are all engaging the same seal diameter of the flow tube 201, the valve sleeve is balanced with respect to the pressures of fluids within the flow tube. Moreover, during lowering the hydrostatic head of fluids is transmitted via the ports 229 and 228 and the floating piston 225 to the chamber 224 and is offset or balanced by the same pressure acting through the annulus ports 226 over the same cross-sectional area of the piston 214. As a consequence, the valve sleeve 207 is completely balanced and does not tend to move vertically as the apparatus is lowered into a fluid filled well bore.

A test depth the packer is set as previously described, and the pipe string is manipulated to cause the outer member 231 to telescope downwardly with respect to the inner member 233, closing off the port 229 and trapping or memorizing the hydrostatic head within the chamber 224. Pressure is applied to the annulus to open the valve and acts through the annulus ports 220 on the lower end surface of the piston 24, shifting the valve sleeve upwardly against the bias of the coil spring 22 to open position where the ports 205 and 206 are in communication via the valve sleeve recess 208 as shown in FIG. 2B. Hereagain, the volume of the chamber 224 is quite large in relation to the displacement volume due to movement of the valve sleeve 207, so that there is practically no increase in pressure within the chamber 224 as the valve sleeve moves upwardly. To close the valve, the applied annulus pressure is bled off, enabling the coil spring 222 assisted by gas pressure to force the valve sleeve 207 downwardly to its closed position as shown in FIG. 5A.

It will now be apparent that a new and improved pressure controlled tester valve has been disclosed, the valve being operable in response to a substantially fixed value of applied annulus pressure without regard to test depth. The valve element is balanced with respect to hydrostatic pressure in the well bore, so that neither elaborate calculations nor myriads of well data are necessary for successful operation of the tester valve.

Since certain changes or modifications may be made in the disclosed embodiments without departing from the inventive concepts involved, it is the aim of the appended claims to cover all such changes or modifications falling within the true spirit and scope of the present invention.

I claim:

1. A fluid pressure controlled well tester apparatus comprising: housing means adapted for connection to a pipe string and having a flow passage extending therethrough for conducting formation fluids from an isolated formation interval; valve means movable from a position closing said flow passage to a position opening said flow passage in response to a change in the pressure of fluids in the well annulus externally of said housing means; chamber means containing a compressible fluid medium, said valve means having a transverse, pressure area with one side thereof subject to the pressure of fluids in said well annulus and the other side subject to the pressure of said fluid medium; means for equalizing the pressure of said fluid medium with the hydrostatic head of the well fluids externally of said housing means; and selectively operable means for closing said equalizing means, so that pressure applied to the fluids externally of said housing means subsequent to the closing of said equalizing means can act on said one side of said pressure area to move said valve means from closed to open position.

2. The tester apparatus of claim 1 further including biasing means for continuously urging said valve means toward closed position.

3. The well tester apparatus of claim 1 wherein said equalizing means includes a port through which the hydrostatic head of the well fluids is communicated to said compressible fluid medium, said closing means including a valve operable in response to manipulation of said pipe string for closing off said port.

4. The well tester apparatus of claim 1 wherein said valve means comprises an annular element that is slidable with respect to said housing means between longitudinally spaced positions, said annular element having a piston section providing said transverse pressure area.

5. The well tester apparatus of claim further including a tube that is concentrically disposed within said housing means, said chamber means being defined between an inner wall of said housing means and an outer wall of said tube, said tube providing a portion of said flow passage.

6. The well tester apparatus of claim 5 further including a partition movably mounted at one end of said chamber for providing a separation between said compressible fluid medium and the well fluids present in said equalizing means and for transmitting the pressure of the well fluids to said fluid medium.

7. The well tester apparatus of claim 1 further including a transverse barrier formed in said housing means, a portion of said flow passage being formed to extend past said barrier, said valve means being movably disposed adjacent to said barrier.

8. The well tester apparatus of claim 7 wherein said barrier is provided by an annular member having a closed upper end and flow ports extending laterally through the wall thereof, said valve means being movably received within said annular member and having a valve head that engages a valve seat located on said annular member below said flow ports, disengagement of said valve head and valve seat enabling fluid flow through said flow ports and past said barrier.

9. The well tester apparatus of claim 7 further including a flow tube disposed longitudinally of said housing means, said barrier being formed intermediate the ends of said flow tube, said flow tube having transverse flow ports extending through the wall thereof above and below said barrier, said valve means being constituted by an annular sleeve member that is slidably disposed on said flow tube adjacent said barrier for movement between one position closing off said flow ports and another position enabling communication between said flow ports.

10. A well tester apparatus comprising: upper and lower housing members adapted to be connected in a pipe string, said housing members each having a flow passage extending upwardly therein; pressure responsive first valve means in said upper housing and movable between positions for opening and closing said flow passages; chamber means containing a compressible fluid medium, said first valve means having a transverse pressure area with one side thereof subject to the pressure of fluids in the well annulus externally of said upper housing member and the other side thereof subject to the pressure of said fluid medium; port means for applying the hydrostatic head of well fluids to said fluid medium as the apparatus is lowered into a well bore to equalize the pressures acting on said sides of said transverse pressure area; and second valve means operable in response to downward movement of said upper housing member with respect to said lower housing member for closing off said port means to trap a value of pressure in said chamber means substantially equal to said hydrostatic head, so that pressure applied to the fluids externally of said housing members subsequent to the closing of said port means by said second valve means can act to develop a pressure differential across said transverse pressure area to move said first valve means from closed to open position.

11. The well tester apparatus of claim 10 further including third valve means operable in response to vertical movement of said upper housing member with respect to said lower housing member for opening and closing said flow passage in said lower housing member.

12. The well tester apparatus of claim 10 further including spring means for continuously urging said first valve means toward closed position, and functioning to return said first valve means from open to closed position upon the release of pressure applied to the fluids externally of said housing members.

13. The well tester apparatus of claim 10 wherein said first valve means comprises a tubular mandrel open from one end to the other and having a piston section presenting said transverse pressure area, said valve mandrel having further transverse cross-sectional areas sized so that the pressure of fluids within said flow passages act with equal force in opposite longitudinal directions.

14. The well tester of claim 13 further including a barrier sleeve within said first housing member, said barrier sleeve having a closed upper end and flow ports through the side walls thereof, an upper portion of said tubular mandrel being sealingly and slidably received within said barrier sleeve and having a valve head that is coengageable with a valve seat on said upper housing member below said flow ports.

15. The well tester apparatus of claim 14 further including a second valve head on said tubular mandrel below said first mentioned valve head, said second valve head being coengageable with a second valve seat on said upper housing member, the annular space externally of said tubular mandrel between said valve seats defining a flow-through sample chamber adapted to confine a sample of formation fluids upon simultaneous engagement of said valve heads with said valve seats.

16. The well tester apparatus of claim 10 wherein said compressible fluid medium is nitrogen gas, and further including a movable partition sealingly received at one end of said chamber means for providing separation between said nitrogen gas and the well fluids entering said port means, said partition additionally functioning to transmit the hydrostatic head of the well fluids to said compressible fluid medium.

17. The well tester apparatus of claim 16 wherein said port means opens outwardly to the well annulus intermediate the ends of a reduced diameter section of the lower end portion of said upper housing member, said second valve means being formed in part by a valve seat inside the upper end of said lower housing member adapted to receive said reduced diameter section.

18. A pressure controlled well tester apparatus comprising: an elongated tubular housing member adapted for connection to a pipe string and to be lowered into a fluid filled well bore; said housing member having at its upper portion an internal annular valve seat; barrier means located above said valve seat, said barrier means being an annular member with a closed upper end and having flow ports extending laterally through the wall thereof; a valve mandrel having its upper end portion slidably received within said barrier means and including an annular valve head engageable with said valve seat to prohibit fluid flow through said flow ports; said valve member being movable downwardly to a position where said valve head is disengaged from said valve seat to enable fluid flow through said flow ports; said valve mandrel having a piston section that is sealingly slidable with respect to said housing member and provides a transverse pressure area with an upper side and a lower side; first port means for subjecting the upper side of said piston section to the pressure of fluids in the well annulus externally of said housing member; spring means pressing upwardly on the lower side of said piston section; a chamber of substantial volume defined between an inner wall of said housing member and the outer wall of a flow tube concentrically disposed within said housing member, said chamber containing a compressible fluid medium, the lower side of said piston section being subjected to the pressure of said fluid medium; second port means for applying the hydrostatic head of the well fluids externally of said housing member to said compressible fluid medium so that pressure of said fluid medium is substantially equal to said hydrostatic head; and a valve selectively operable at test depth for closing off said second port means, so that pressure applied to the well fluids externally of said housing can act via said first port means on said upper side of said piston section to develop a pressure difference thereacross and force said valve mandrel downwardly to a position where said valve head is disengaged from said valve seat.

19. The well tester apparatus of claim 18 further including a second valve seat on said housing member and a second valve head on said valve mandrel located below said first mentioned valve head and seat, the space between said housing member and said valve mandrel and between said valve seats providing a flow through sample chamber adapted to trap a sample of formation fluids when said valve heads are simultaneously engaged with said valve seats.

20. The well tester apparatus of claim 19 further including separable coupling means in said housing member below said lower valve seat and in said valve mandrel below said lower valve head, separation of said coupling means enabling that portion of the apparatus defining the sample chamber to be disconnected from the balance of the apparatus.

21. The well tester apparatus of claim 18 wherein said second port means extends between the lower end of said chamber and a side opening in the wall of reduced diameter lower section of said housing member, said lower section being adapted for telescopic reception within the upper end of a second housing member located therebelow, said second housing member having an inner wall surface adapted to span and close off said side opening.

22. The well tester apparatus of claim 21 further including a movable partition sealingly received in the lower end of said chamber and functioning to separate said compressible fluid medium from the well fluids entering said second port means and to transmit the hydrostatic head of said well fluids to said fluid medium.

23. A pressure controlled well tester apparatus comprising: an elongated housing member having a flow tube disposed concentrically therein, said flow tube having a transverse barrier intermediate the ends thereof; port means through the wall of said flow tube above and below said barrier, said port means and the bores in said flow tube extending respectively above and below said barrier providing a flow passage; sleeve valve means slidable on said flow tube adjacent said barrier between a closed position blocking communication between said port means and an open position permitting communication between said port means; chamber means within said housing member and containing a compressible fluid medium, a portion of said sleeve valve means providing a piston section having a transverse pressure area with one side subject to the pressure of fluids in the well annulus externally of said housing member and the opposite side subject to the pressure of said fluid medium; a pressure transmitting channel for applying the hydrostatic head of the fluids in a well bore to said fluid medium as the apparatus is lowered into a well bore so that substantially the same fluid pressure acts on both sides of said transverse pressure area; and a valve structure operable at test depth for closing off said channel to trap the hydrostatic head of the well fluids within said chamber means, so that pressure applied to the well fluids externally of said housing member subsequent to the closing of said channel by said valve structure can act on said one side of said pressure area and develop a pressure differential thereacross to move said sleeve valve means from closed to open position.

24. The well tester apparatus of claim 23 further including spring means pressing between one end of said sleeve valve means and an outwardly directed shoulder on said flow tube for continuously urging said sleeve valve means toward closed position.

25. The well tester apparatus of claim 24 wherein said sleeve valve means comprises a sleeve member having an internal recess for communicating said port means with one another in the open position of said valve means and a valve head section for closing off at least one of said port means in the closed position of said valve means.

26. The well tester apparatus of claim 24 wherein said chamber means is located within said housing member above said sleeve valve means, said spring means being located within said chamber means, and further including a movable partition at the upper end of said chamber means for transmitting the pressure of fluids in said channel to said fluid medium.

27. The well tester apparatus of claim 23 wherein said valve structure includes an annular member adapted for connection to a pipe string and telescopically received over an upper reduced diameter section of said housing member, said pressure transmitting channel having an opening to the exterior of said housing member intermediate the ends of said reduced diameter section, said annular member being selectively movable with respect to said section to a position closing off said opening.

28. A method of operating a test valve that is positioned in a fluid-filled well bore in order selectively to conduct fluids from an isolated formation interval, said test valve including a normally closed valve element having pressure responsive areas one of which is subject to the pressure of fluids in the well bore externally of said test valve and the other of which is subject to the pressure of a compressible fluid medium contained within a chamber in said test valve, comprising the steps of: equalizing the pressure of said fluid medium with the hydrostatic head of the well fluids externally of said test valve to establish within said chamber a value of pressure peculiar to the depth of the well bore where said test valve is positioned; closing said chamber to confine therein said value of pressure; and then while maintaining said chamber in a closed condition, moving the valve element from said normally closed position to an open position by applying pressure to the well bore at the surface to increase the pressure of the well fluids externally of said test valve to a value in excess of the value of pressure confined within said chamber, the difference in pressure acting across said areas to develop a force that is effective to move said valve element to said open position to permit a flow of formation fluids from said isolated formation interval through said test valve.

29. The method of claim 28 including the further steps of releasing the increase in pressure and returning the valve element from open position to closed position while continuing to maintain said chamber in a closed condition.

30. The method of claim 28 including the further steps of precharging the chamber containing said fluid medium to an intial pressure that is less than the hydrostatic head of the well fluids at test depth, and then lowering the test valve into the well bore.

31. The method of claim 30 wherein the precharge pressure is approximately 500 psi less than the hydrostatic head of the well fluids at test depth.

32. A method of operating a pressure controlled test valve that is disposed in a fluid-filled well bore in order selectively to conduct formation fluids from an isolated formation interval, said test valve having a normally closed valve element with a transverse pressure area that is subject on one side to the pressure of fluids in a well bore and on the other side to the pressure of a compressible fluid medium contained within a chamber in the test valve, the application of pressure to said one side shifting the valve element from closed to open position, comprising the steps of: charging the chamber containing said fluid medium to an initial pressure that is less than the hydrostatic head of the well fluids at test depth; lowering the test valve into the well bore; from the point in the well bore where the hydrostatic head is equal to the charge pressure in said chamber on downward to test depth, equalizing the pressure of said fluid medium with the hydrostatic head of the well fluids so that the same pressure acts on both sides of said transverse area; closing the chamber at test depth in order to confine therein a value of pressure substantially equal to the hydrostatic head at test depth; and then while maintaining said chamber in a closed condition, applying pressure to the well fluids externally of said test valve to increase the external pressure to a value in excess of said hydrostatic head so that a pressure difference is developed across said transverse area effective to shift the valve element from closed to open position, thereby to permit a flow of formation fluids from an isolated formation interval.

*33. A fluid pressure controlled well apparatus comprising: housing means adapted to be connected to a pipe string and having a flow passage extending therethrough for conducting formation fluids from an isolated formation interval; valve actuator means including a tubular member defining a portion of said flow passage and movable with respect to said housing means between longitudinally spaced positions in response to a change in the pressure of fluids in the well annulus externally of said housing means; chamber means for containing a compressible fluid medium, said tubular member having a transverse pressure area with one said thereof subject to the pressure of fluids in said well annulus and the other side thereof subject to the pressure of said fluid medium; means for equalizing the pressure of said fluid medium with the pressure of well fluids externally of said housing means; and selectively operable means for closing said equalizing means, so that pressure applied to the fluids externally of said housing means subsequent to the closing of said equalizing means can act on said one side of said pressure area to move said valve actuator means from one of said longitudinally spaced positions to another of said longitudinally spaced positions.*

*34. The apparatus of claim 33 further including spring means reacting between said housing means and said tubular member for continuously urging said tubular member toward said one longitudinally spaced position.*

*35. The apparatus of claim 34 further including a partition movably mounted at one end of said chamber means for providing a separation between said compressible fluid medium and the well fluids present in said equalizing means and for transmitting the pressure of the well fluids to said fluid medium.*

*36. The apparatus of claim 33 wherein said tubular member has an outwardly directed shoulder defining a piston section which provides said transverse pressure area, said piston section being sealingly slidable with respect to said housing means.*

*37. The apparatus of claim 33 wherein said equalizing means includes fluid inlet means through which the pressure of the well fluids is communicated to said compressible fluid medium, said closing means including a valve element movable relative to said housing means for opening and closing said fluid inlet means.*

*38. A fluid pressure controlled well apparatus comprising: housing means adapted to be connected to a pipe string, said housing means having an inwardly directed shoulder and cylinder means adjacent said shoulder; valve actuator means including a tubular mandrel having a reduced diameter portion sealingly slidable with respect to said shoulder and an enlarged diameter piston section sealingly slidable with respect to said cylinder means, said mandrel being movable with respect to said housing means between longitudinally spaced positions in response to a change in the pressure of fluids in the well annulus externally of said housing means; chamber means within said housing means for containing a compressible fluid medium, said piston section having one side thereof subject to the pressure of fluids in said well annulus and the other side thereof subject to the pressure of said fluid medium; means for transmitting the pressure of fluids in said well annulus to said compressible fluid medium whereby said pressure initially acts on both sides of said piston section; and selectively operable valve means for preventing transmission of the pressure of fluids in said well annulus to said compressible fluid medium, so that pressure subsequently applied to the fluids in the well annulus externally of said housing means can act on said one side of said piston section to move said tubular mandrel from one to another of said longitudinally spaced positions.*

*39. The apparatus of claim 38 further including spring means reacting between said housing means and said valve actuator means for continuously urging said valve actuator means toward said one position.*

*40. The apparatus of claim 38 wherein said transmitting means includes a partition movably mounted at one end of said chamber means for providing a separation between said compressible fluid medium and fluids in said well annulus.*

*41. The apparatus of claim 40 wherein said transmitting means further includes fluid inlet means through which the pressure of well fluids is communicated to the interior of said housing means, said valve means including a valve element movable relative to said housing means for opening and closing said fluid inlet means.*

*42. The apparatus of claim 40 wherein said transmitting means includes a port through which the pressure of well fluids in said annulus is communicated to said compressible fluid medium, said valve means including a valve element that is operable in response to manipulation of the pipe string for closing off said port.*

*43. The apparatus of claim 38 further including a tube that is concentrically disposed within said housing means, said chamber means being defined in part between an inner wall of said housing means and an outer wall of said tube, said tube providing a portion of said flow passage.*

* * * * *